(12) United States Patent
Procter et al.

(10) Patent No.: US 10,956,465 B2
(45) Date of Patent: Mar. 23, 2021

(54) SYSTEM AND METHOD FOR THOUGHT OBJECT SELECTION

(71) Applicant: FULCRUM MANAGEMENT SOLUTIONS LTD., Rossland (CA)

(72) Inventors: Thomas Procter, Rossland (CA); Brian Christofer Tomic, Rossland (CA); Michael Adam Gelbart, Rossland (CA)

(73) Assignee: Fulcrum Management Solutions LTD., Rossland (CA)

( * ) Notice: Subject to any disclaimer, the term of this patent is extended or adjusted under 35 U.S.C. 154(b) by 0 days.

(21) Appl. No.: 16/726,826

(22) Filed: Dec. 25, 2019

(65) Prior Publication Data

US 2020/0167378 A1 May 28, 2020

Related U.S. Application Data

(63) Continuation-in-part of application No. 15/066,303, filed on Mar. 10, 2016, which is a continuation of
(Continued)

(51) Int. Cl.
*G06F 16/33* (2019.01)
*G06F 16/335* (2019.01)
(Continued)

(52) U.S. Cl.
CPC ........ *G06F 16/3334* (2019.01); *G06F 16/335* (2019.01); *G06F 16/338* (2019.01); *G06F 16/3344* (2019.01); *G06F 40/103* (2020.01); *G06F 40/177* (2020.01); *G06F 40/284* (2020.01)

(58) Field of Classification Search
CPC .. G06F 16/3334; G06F 16/338; G06F 16/335; G06F 40/103
See application file for complete search history.

(56) References Cited

U.S. PATENT DOCUMENTS

2007/0067273 A1* 3/2007 Willcock ............... G06Q 30/02
2012/0096014 A1* 4/2012 Davids .................. G06Q 10/10
707/749
(Continued)

*Primary Examiner* — Sujay Koneru
*Assistant Examiner* — Mohamed N El-Bathy
(74) *Attorney, Agent, or Firm* — Marin Patents LLC; Gustavo Marin

(57) ABSTRACT

Systems and methods for processing qualitative responses from a plurality of user devices whereby a selection of a next thought object, to deliver to a first user device, may be based on a plurality of qualitative responses received from a plurality of user devices. In a preferred embodiment, a thought object selection computer may compute the selection by determining a filtered set of thought objects by custom selection. In some embodiments, if the quantity of the filtered set of thought objects is greater than a pre-configured amount the selection may be computed by randomly selecting a subset of the filtered set of thought objects. Further filtering the filtered set of thought objects by determining one or more least seen thought objects, and selecting a most diverse thought object, updating the filtered set of thought objects and sending the filtered set of thought objects to the first user device.

16 Claims, 12 Drawing Sheets

Related U.S. Application Data application No. PCT/CA2014/050889, filed on Sep. 17, 2014.

(60) Provisional application No. 61/880,578, filed on Sep. 20, 2013, provisional application No. 61/951,044, filed on Mar. 11, 2014.

(51) Int. Cl.
*G06F 40/284* (2020.01)
*G06F 40/177* (2020.01)
*G06F 40/103* (2020.01)
*G06F 16/338* (2019.01)

(56) References Cited

U.S. PATENT DOCUMENTS

2012/0109714 A1* 5/2012 Azar ............... G06Q 30/0203
 705/7.32
2015/0172388 A1* 6/2015 Moran ............... H04N 21/278
 715/753

* cited by examiner

SYSTEM AND METHOD FOR THOUGHT OBJECT SELECTION

CROSS-REFERENCE TO RELATED APPLICATIONS

This application is a continuation-in-part of U.S. patent application Ser. No. 15/066,303, titled "PROCESSING QUALITATIVE RESPONSES", which was filed on March 10, which is a continuation of International Patent Application No. PCT/CA2014/050889, filed Sep. 17, 2014, which claims priority to each of U.S. Provisional Application No. 61/880,578, filed Sep. 20, 2013, and U.S. Provisional Application No. 61/951,044, filed Mar. 11, 2014, the specifications of each of which are hereby incorporated by reference in their entirety.

BACKGROUND OF THE INVENTION

Field of the Art

The disclosure relates to the field of processing qualitative responses from a plurality of user devices, and more particularly to the field of computing and selecting a next thought object for a plurality of qualitative responses received from a plurality of user devices.

Discussion of the State of the Art

In systems where input from a plurality of user devices is solicited, understanding an effective distribution mechanism of thought objects for solicitation of responses by a plurality of user devices is challenging.

Typically, when results from a plurality of user participant devices are used to gather input on a subject, two different types of participant responses are elicited: quantitative responses and qualitative responses. A quantitative response is a close-ended response, such as a multiple choice, numeric style, or yes/no response. A qualitative response is an open-ended, comment style response, where the participant has freedom to textualize associated ideas and is not constrained by pre-determined answers. Accordingly, eliciting qualitative responses may have substantial benefits over quantitative responses in that qualitative responses can provide more detailed information on participant interests, consisting of areas of alignment, sentiment or topics, to name a few.

However, there are well known limitations with handling, evaluating, and distributing qualitative responses, as compared to quantitative responses. The problem of distributing qualitative responses generalizes to dealing with what a next best qualitative response to display to one or more user devices would be, in order to receive a more complete response pattern by the one or more user devices. Specifically, there is no easy way to ensure that the one or more user devices received a diverse enough set of qualitative responses to have a complete, or near complete view of the subject at hand.

Further according to the art, many online engagement services offer methods of displaying items and information based on previous selections and engagements in a themed fashion, that is, showing future information what has been previously liked or engaged by a user. These systems do not take into consideration a display of a diverse set of information to users.

Accordingly, a need in the art exists for a system and method for computing a distribution pattern of information whereby thought objects are displayed with equal coverage while reducing bias and displaying thought objects representing a diverse range of thoughts to one or more user devices.

SUMMARY OF THE INVENTION

Accordingly, the inventor has conceived and reduced to practice, in a preferred embodiment of the invention, a system and method comprising a network-connected thought object distribution computer comprising a processor, a memory, and programming instructions, the programming instructions, when executed by the processor, cause the processor to receive, at a project controller, a question object, from a leader device, comprising an arrangement of information, distributing the question object to a plurality of participant devices and receiving a plurality of thought objects (each comprising additional arrangements of information) from the plurality of participant devices; computing a distribution strategy for the plurality of thought objects, and redistributing, by the project controller, the plurality of thought objects to at least a portion of the participant devices; whereby a plurality of filtering and section algorithms are executed by receiving request from a user device to rate a thought object, filtering at least a portion of thought objects by custom selection method (referring to FIG. 9). Once filtered, zero or more filtered thought objects are returned. If no filtered thought objects are returned then the algorithm ceases, a notice may be sent to participant devices indicating an absence of thought objects. The returned filtered thought objects are optionally further filtered by random selection. The filtered thought objects are then further filtered by a least seen algorithm (referring to FIG. 10), and finally selected by a topic algorithm. Once thought objects are filtered, selected, and distributed, the project controller then receives a plurality of priority values from at least a portion of the plurality of user participant devices, whereby the plurality of priority values is each associated to a thought object.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
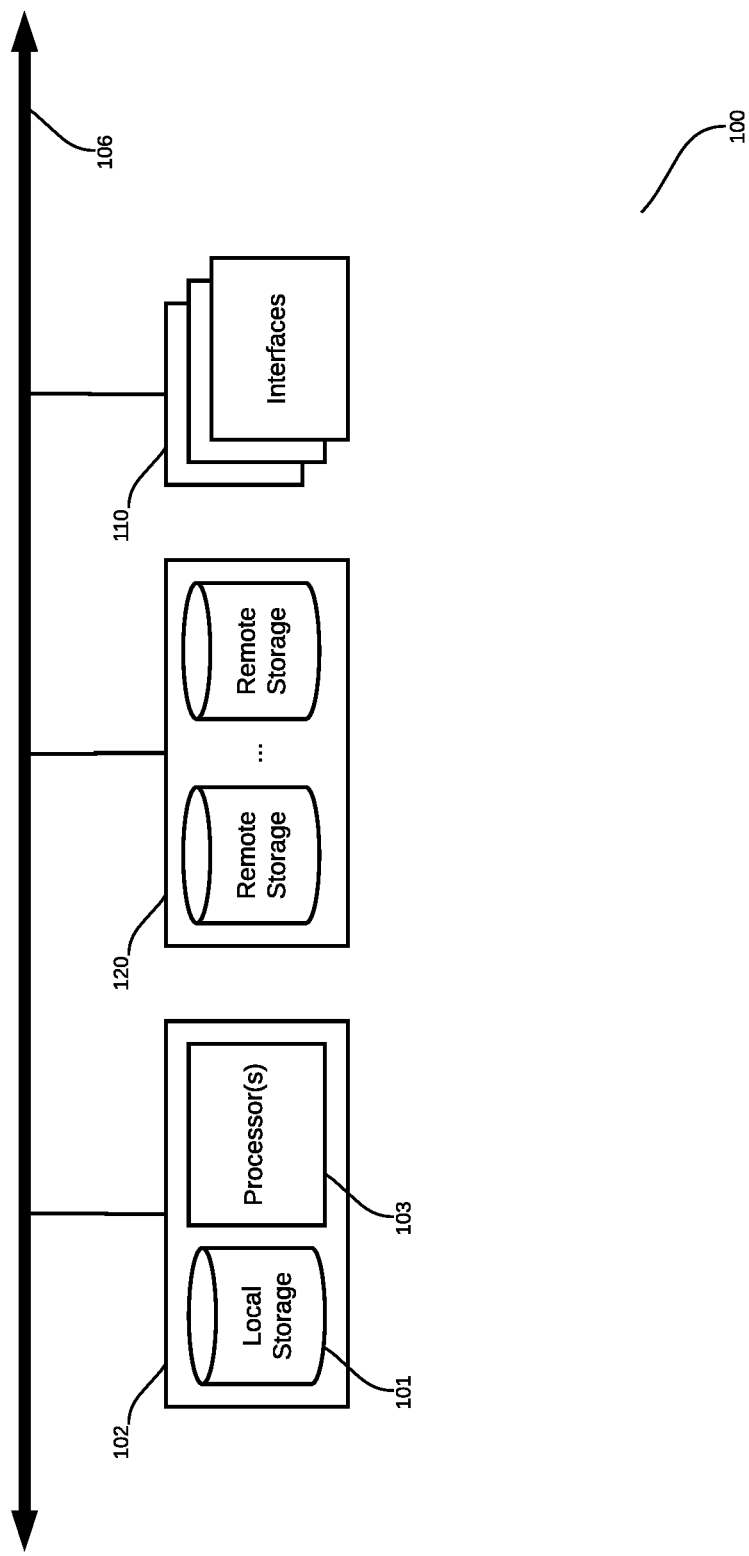
FIG. 1 is a block diagram illustrating an exemplary hardware architecture of a computing device used in an embodiment of the invention.

The inventor has conceived, and reduced to practice, a system and method for computing a selection of a one or more thought objects for distribution to a plurality of user devices whereby the one or more thought objects provide equal coverage while reducing bias and comprise thought objects representing a diverse range of thoughts.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

A priority value, as referred to herein, is a response received from a user device and may be a scale represented by one or more stars, representations, or numbers (such as a Likert scale or a zero-centered scale, or the like). In some embodiments, a zero-priority value is a value usable by the system. In some embodiments, the scale is normalized, in other embodiments the scale is a standard scale that may or may not include negative values. In other embodiments, a priority value scale may be a plurality of graphical elements indicating a spectrum of dislike to like, interest or sentiment level, or the like). In some embodiments, graphical scales are converted to a numeric scale for calculation purposes.

In some embodiments, assigned, as referred to herein, for example, with respect to a participant object 575 assigning a priority value to a thought object, may refer to priority values that may have been received by a device 620 and associated to a thought object 510, the device 620 associated to the participant object 575.

Rating, as referred to herein, may be a priority value response received from a device 620 associated to a participant object 575. Ratings may be a numeric value on a scale indicating a range of possible responses available to assign to a thought object 510.

Hardware Architecture

Generally, the techniques disclosed herein may be implemented on computing hardware or a combination of programming instructions and hardware to form a specially programmed computer. For example, they may be implemented in an operating system kernel, in a separate user process, in a library package bound into network applications, on a specially constructed machine, on an application-specific integrated circuit (ASIC), or on a network interface card.

An implementation based on programming instructions and hardware may describe at least some of the embodiments disclosed herein and may be implemented on a programmable network-resident machine (which should be understood to include intermittently connected network-aware machines) selectively activated or reconfigured by computer program instructions stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, wearable device, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (for example, a peripheral component interconnect (PCI) bus). When acting under the control of appropriate software or firmware, CPU 102 (i.e. processor) may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
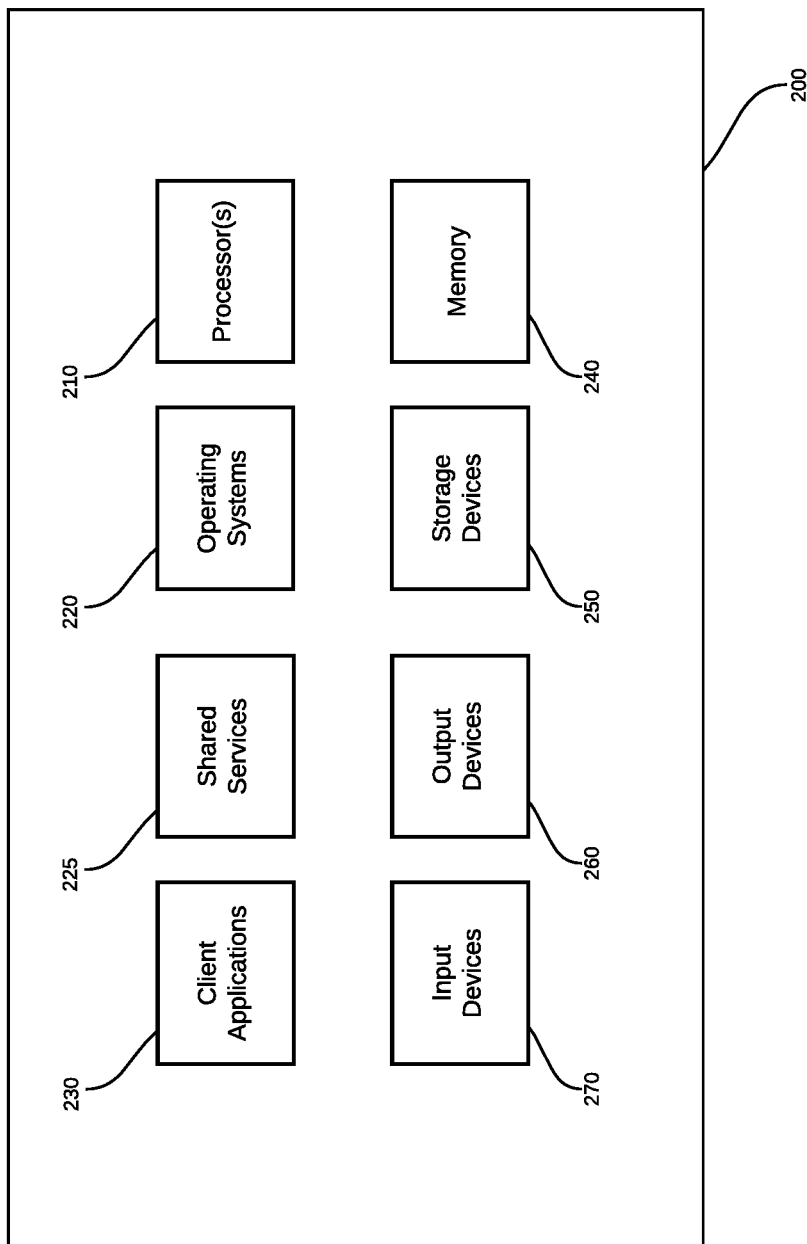
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
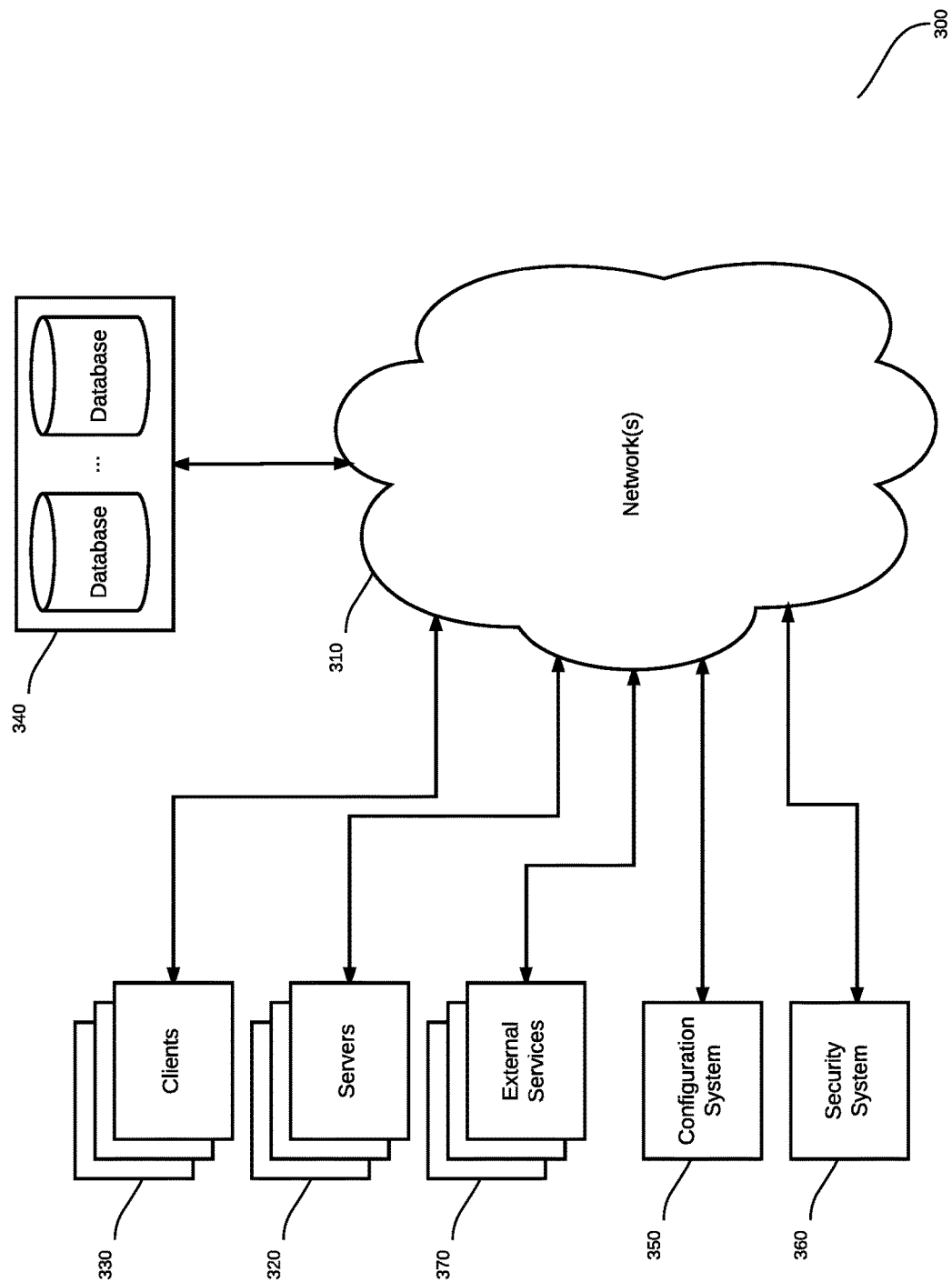
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular interaction. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
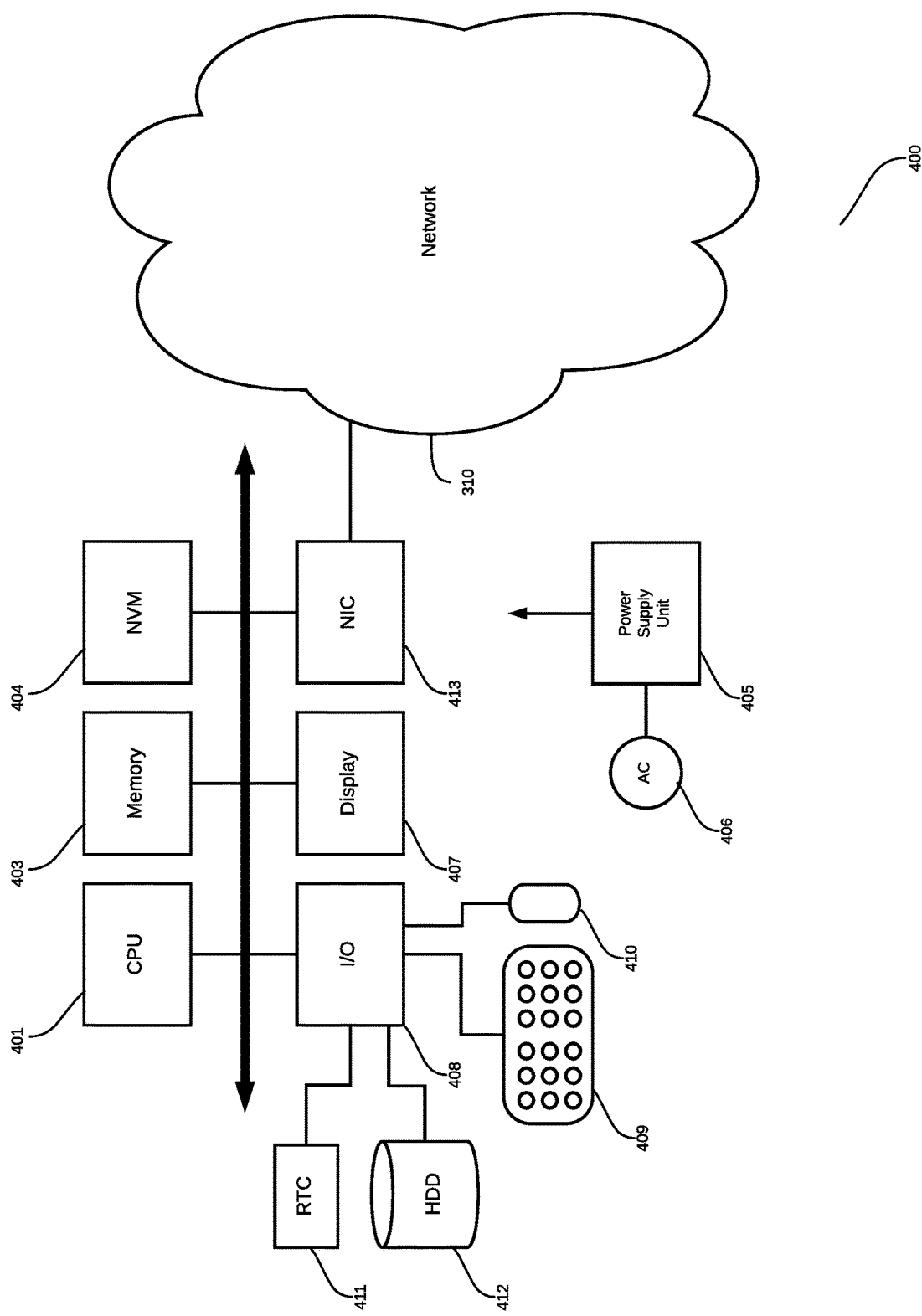
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 310, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
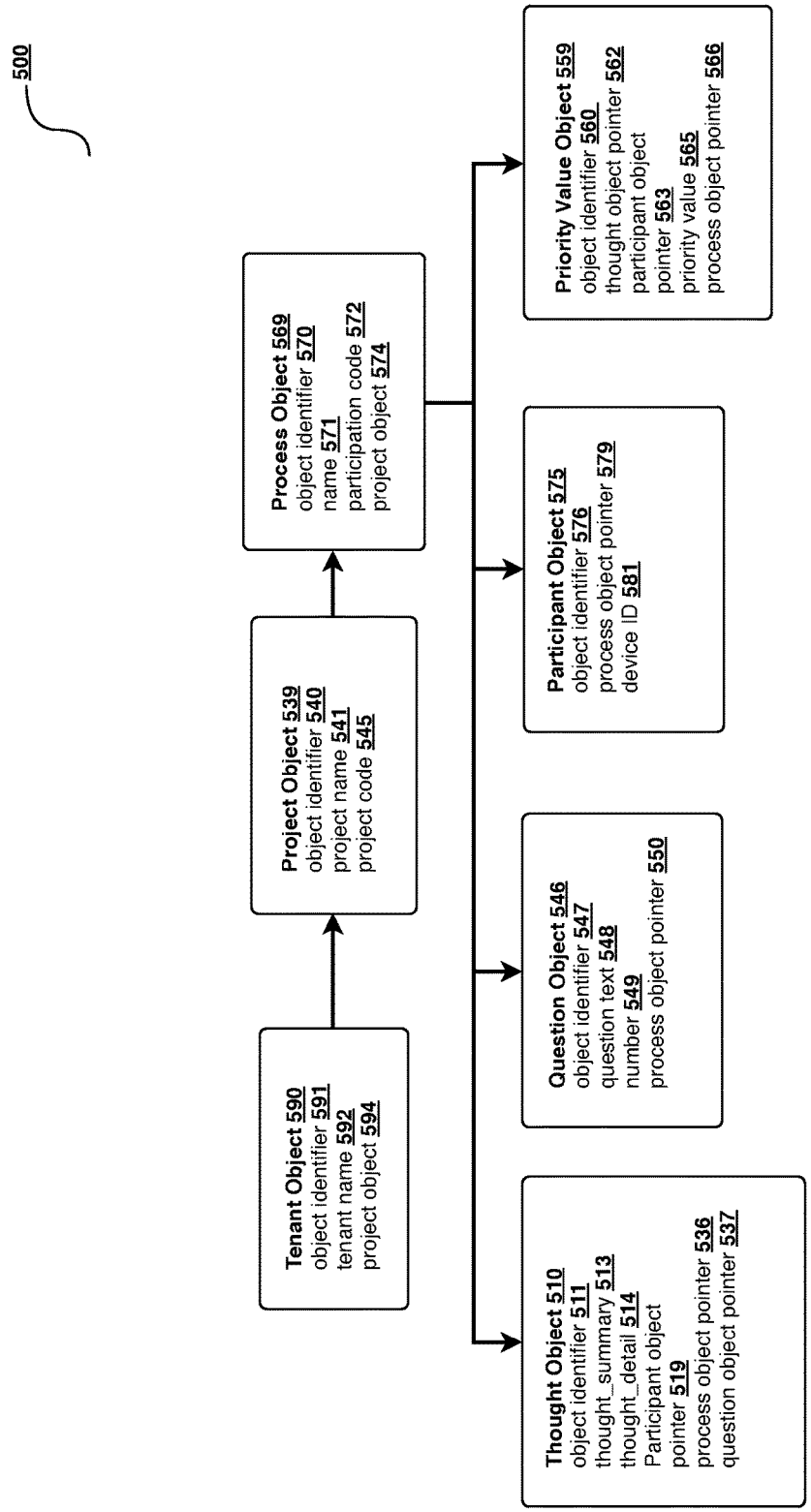
FIG. 5 is a plurality of objects used for thought object filtering and selection, according to a preferred embodiment of the invention.

FIG. 5 is a plurality of objects used for thought object filtering and selection, according to a preferred embodiment of the invention. According to the embodiment, a plurality of programming instructions stored in memory 240 that when executed by at least one processor 210 comprise a plurality of objects that may comprise data, in the form of fields, often known as attributes and programming instructions, in the form of procedures, often known as methods. Objects 500 may be arranged such that procedures can access and often modify one or more data fields of an associated object. In various embodiments, programming instructions enable objects to interact with one another. In a preferred embodiment, objects 500 may be implemented in an object-relational database management system, for example PostgreSQL.

Accordingly, It can be appreciated that an understanding of a plurality of priority values received from a plurality of participant devices 620 provides a means for large scale involvement of users via devices 620 in a networked environment to participate in a quantitative fashion to evaluate thoughts that require an understanding of interest regardless of device location, temporal displacement (i.e. when the respondents responded), psychology (willingness to provide responses in an open forum, or requirement for anonymity), and the like. An interest categorization may represent a collective understanding of what may be most important to at least a portion of a group of users associated to devices 620, for example, across dispersed groups such that understanding of concepts and perspective using accurate priority-based indicators from a plurality of participant devices 620 by a plurality of users.

Tenant object 590 may be a plurality of programming instructions stored in memory 240 that when executed by one or more processors 210 describe a tenant of system 600, that is, a configured entity that may execute a plurality of projects described by one or more associated project objects 539 for analysis of interest for a plurality of priority values received from a plurality of participant devices 620 associated to one or more thought objects 510. Accordingly, one or more project objects 539, that are associated to the tenant object 590, are connected by project object pointer 594. In a preferred embodiment, tenant object 590 may comprise: an object identifier 591 whereby each instantiation of tenant object 590 may be referred to uniquely within the system; tenant name 592 may be a text description of the instant tenant object 590; project object pointer 594 (described above) comprises one or more pointers to one or more project objects 539. Said differently, system 600 may configure multiple tenant objects 590 whereby each tenant object 590 may be associated to a plurality of project objects 539 whereby each associated project object 539 is associated to a plurality of other objects 500 (depicted in FIG. 5) to enable analysis of qualitative patterns for a plurality of priority values received from a plurality of participant devices 620. It should be appreciated that participant devices 620 may be at least a portion of devices 620. In a preferred embodiment, participant devices 620 may be devices that, through network 310, provided responses to, for example, a question object 546 and/or thought objects 510. In some embodiments, leader devices 622 (referring to FIG. 6) may be considered participant devices 620.

Figure 6:
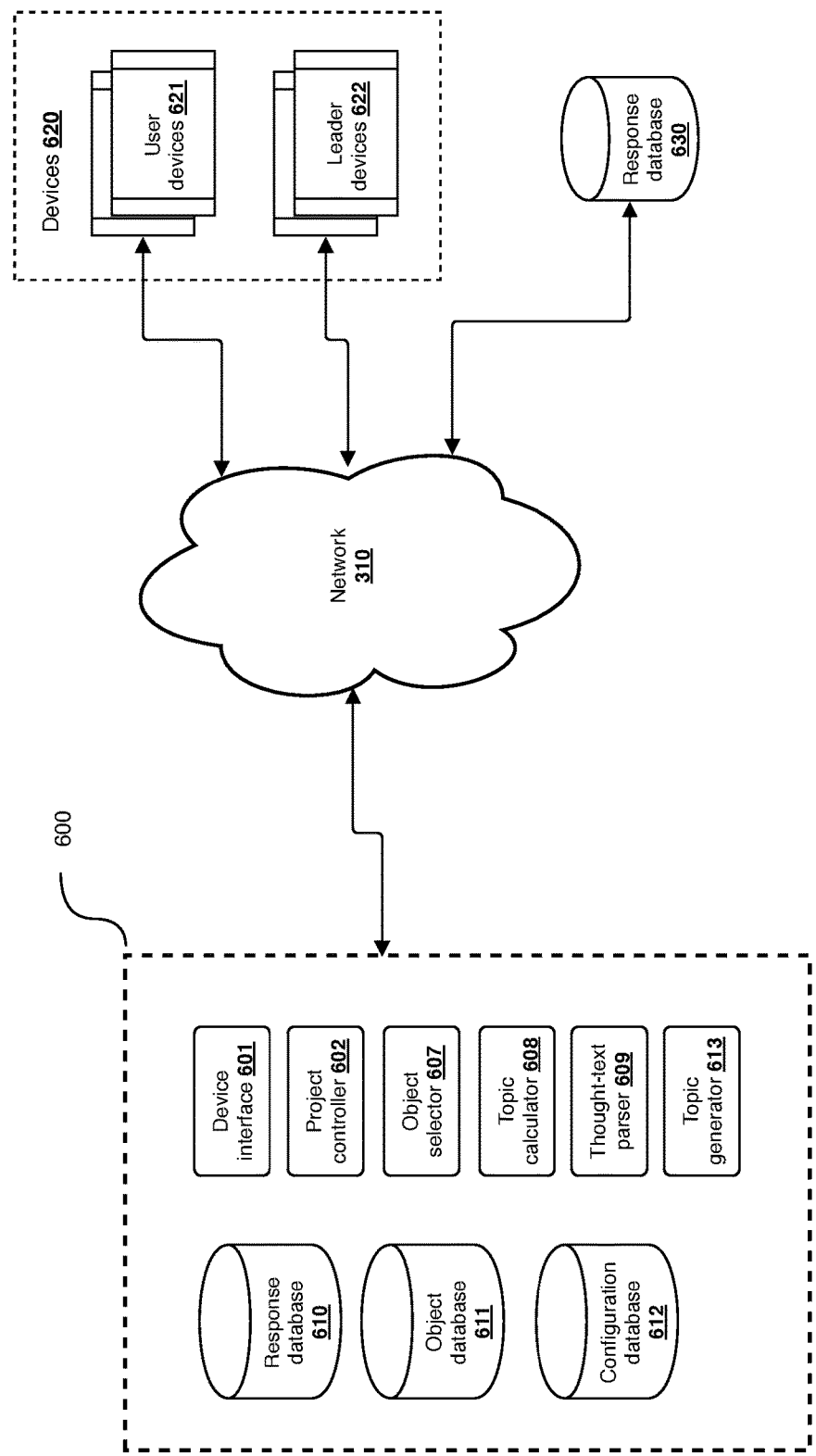
FIG. 6 is a block diagram illustrating an exemplary conceptual architecture of a thought object selection computer, according to a preferred embodiment of the invention.

Project object 539 may be a plurality of programming instructions stored in memory 240 that when executed by processors 210 describe a project for an analysis of qualitative patterns for a plurality of priority values received from a plurality of participant devices 620 based on one or more thought objects 510 whereby a project may be a planned collaborative executions of the methods described herein utilizing one or more specially programmed components 600 (referring to FIG. 6). Project object 539 may comprise: object identifier 540 which may be a globally unambiguous persistent identifier representing an instance of project object 539; project name 541 may be textual description of the instance of the project object 539; project code 545 may be unique identifier associated to a project object 539. Thought object 510 may be a plurality of programming instructions stored in memory 240 that when executed by processors 210 comprise an arrangement of information in the form of ideas received from a device 620 whereby an analysis of qualitative patterns for a plurality of priority values received in response to the arrangement of information from a plurality of participant devices 620. Thought object 510 may comprise: object identifier 511 which may be a globally unambiguous persistent identifier representing an instance of thought object 510; thought_summary 513 may be an arrangement of information corresponding to a qualitative response from a device 620 to another arrangement of information in the form of an open-ended question from, for example, a question object 546; thought_detail 514 may be an additional arrangement of information corresponding to an additional qualitative response from a device 620, for example, an explanation of the importance of the qualitative response represented by thought_summary 513; shared_by 519 is a pointer to a participant object 575 who shared the instant thought object 510; process object pointer 536 may be a pointer to an associated process object 569; question 537 may be a pointer to an associated question object 546 to, for example, have access to the question object 546 through its memory address instead of a new object being created on a stack.

Question object 546 may be a plurality of programming instructions stored in memory 240 that when executed by processors 210 comprise details around the associated arrangement of information associated to a corresponding an open-ended question by, for example, as configured by a leader device 622, the arrangement of information being a point of origination for which a plurality of thought objects 510 result, are distributed by project controller 602, and for which a plurality of priority value responses are solicited from at least a portion of devices 620 to perform an analysis of qualitative patterns. Question object 546 may comprise, at least: object identifier 547 which may be a globally unambiguous persistent identifier representing an instance of question object 546; question text 548 may be an arrangement of information comprising textual description in the form of an open-ended question; number 549 may be an additional unique identifier for the instant question object 546 that may indicate an index of the instant question in a sequence or series of related question objects in a project object 539; process object pointer 550 may be a pointer to an associated process object 569, for example, to have access to the process object 569 through its memory address instead of a new object being created on a stack.

Priority value object 559 may be a plurality of programming instructions stored in memory 240 that when executed by processors 210 comprise an object describing details around a priority value received from a participant device 620. It should be noted that in a typical analysis, a plurality of priority value objects may be associated to a thought object 510 for an analysis of qualitative patterns as described throughout this specification. Priority value object 559 may comprise: object identifier 560 which may be a globally unambiguous persistent identifier representing an instance of priority value object 559; thought object 562 may be a pointer to a corresponding thought object 510, for example, to have access to the an associated thought object 510 through its memory address instead of a new object being created on a stack; participant 563 is a pointer to Participant object 575 that assigned priority value 565 (mentioned below); priority value 565 may be a numeric identifier of the priority value received from a corresponding participant device 620 associated to the participant object 575 referenced in participant pointer 563 (in some embodiments, priority value 565 may be an alphanumeric value, a Boolean, an identifier to an emoticon or some other graphical representation, or the like); process object 566 may be a pointer to a process object 569 to, for example, have access to the process object 569 through its memory address instead of a new object being created on a stack.

Process object 569 may be a plurality of programming instructions stored in memory 240 that when executed by processors 210 comprise an object describing a process corresponding to a project object 539 for an analysis of qualitative patterns. A process may provide a procedure for how a project is to be executed, for example, how thought objects 510 will be distributed, how responses are received and processed, and the like. Process object 569 may comprise: object identifier 570 which may be a globally unambiguous persistent identifier representing an instance of process object 569; name 571 may be textual description of the instance of the process object 569; number 572 may be an additional unique identifier associated to the instant process object 569; project object 574 may be a pointer to a corresponding project object 539 to, for example, have access to the project object 539 through its memory address instead of a new object being created on a stack.

Participant object 575 may be a plurality of programming instructions stored in memory 240 that when executed by processors 210 comprises an object to describe a participant associated to a participant device 620 (that is, each participant object corresponds to a corresponding device 620). In some embodiments, participant objects may be assigned to devices 620 that have participated (for example, provided priority values to one or more thought objects, or provided one or more thought objects 510 in response to a question object 546). Participant object 575 may comprise, at least: object identifier 576 which may be a globally unambiguous persistent identifier representing an instance of participant object 575; process object 579 may be a pointer to an associated process object 569 to, for example, have access to the process object 569 through its memory address instead of a new object being created on a stack; project object 580 may be a pointer to a project object 539 to, for example, have access to the project object 539 through its memory address instead of a new object being created on a stack; device ID identifies an associated user device 620.

It should be noted that, in a preferred embodiment, a tenant object 590 may represent properties and methods corresponding to a user, or group of users, of the system (for example, a company, organization, or the like). Each tenant object 590 may be associated to one or more project object 539 that may provide details around a project for exchanging information following one or more processes associated to one or more process objects 569 whereby at least one question object 546 and a plurality of thought objects 510 describe an interaction by devices 620 (at least a portion of which are associated to a participant objects 575) whereby interaction comprises, at least, an assignment of priority values 559 to thought objects 510.

FIG. 6 is a block diagram illustrating an exemplary conceptual architecture of a thought object selection computer, according to a preferred embodiment of the invention. According to the embodiment, thought object selection environment 600 comprises a plurality of components each comprising at least a plurality of programming instructions, the programming instructions stored in memory 240 that when executed by one or more processors 210, cause one or more processor 210 to perform operations disclosed herein. In a preferred embodiment, a question object 546 is received at a project controller 709 from a first leader device 622. The question object 546 may then be distributed, by project controller 602 to at least a portion of a plurality of devices 620, subsequently, a plurality of thought objects 510 may be received from at least a portion of the at least portion of the plurality of devices 620 whereby the thought objects 510 may be redistributed to at least a portion of the plurality of devices 620 with a request for an assignment, by at least a portion of the plurality of user participant devices 620, of one or more priority values. It should be appreciated that questions objects 546 when received from a leader device 622, the objects and associated parameters may be stored in object database 611. Similarly, thought objects 510 received from the at least portion of the at least portion of the plurality of devices 620 may be stored in object database 611. In some embodiments, one or more priority value objects 559 comprising the one or more priority values associated to a corresponding thought object 510 of the plurality of thought objects 510 are received by one or more devices 620. In some embodiments, project controller 602 processes methods herein based at least in part on configuration within project object 539 and process object 569.

Prior to project controller 602 processing the plurality of priority value objects 559 for the plurality of thought objects 510 from the plurality of devices 620, object selector 607 may use algorithms described herein (referring to FIGS. 8-12) to filter and select objects for distribution to one or more devices 620. It should be appreciated that question object 546 and at least a portion of the plurality of thought objects (and associated other objects 500) are associated to at least one project object 539. In a preferred embodiment, a tenant object 590 may have one or more associated projects 539, that is, that a tenant may perform a plurality of mutually exclusive projects (also referred to herein as an exchange) to understand the dynamics and behaviors of a plurality of users via a plurality of devices. Though in a preferred embodiment, projects are self-contained in nature (in terms of analyses that are performed), it should be appreciated that in some embodiments, projects may be interrelated, and calculations by system 600, may be performed across a plurality of projects.

According to some embodiments, each thought object 510 must meet certain criteria in order to qualify for inclusion into a filter and select computation. These criteria are combinations of meeting (or failing to meet) certain thresholds, as analyzed by thought-text parser 609, topic calculator 608 and object selector 607.

Device interface 601 may manage input/output communications to devices 620, and in some embodiments, to response database 630, over network 310.

Project controller 602 manages an execution of a thought object exchange project whereby project controller 602 may manage receiving and distributing question objects 546 to devices 620, manage receiving and distributing thought objects 510, and receiving and distributing priority value objects 559 via device interface 601.

In a preferred embodiment, object selector 607 filters and selects one or more thought objects 510 for distribution to one or more devices 620. Techniques for filtering and selection by objects selector 607 may include, but not limited to, diversity of thought object 510 based on an analysis of thought object 510 topics, frequency of delivery of a thought object 510 to one or more devices 620, random selection, and the like.

In a preferred embodiment topic calculator 608 may be used by methods disclosed herein to compute a topic of which text within one or more thought objects 510 may represent, that is, quantitatively determine a computed difference between a plurality of thought objects 510 based on informational contents within one or more thought object 510. Further to the embodiment, topic calculator 608 may calculate topic vectors and topic tables using methods described herein.

In a preferred embodiment, thought-text parser 609 may generate a plurality of text based on a vocabulary, the vocabulary generated by parsing text from one or more thought objects 510 (for example, from thought_summary 513 and/or thought_detail 514). In some embodiments text originated from an automatic speech recognition process as is known in the art (not shown). In some embodiments, thought-text parser 609, may modify word contents of the plurality of text by, for example, removing stop words, stemming words, tokenizing words, determine frequency of words, etc. Topic generator 613 may generate a plurality of topic vectors in a topic table, each topic vector associated to a thought object 510 of the plurality of thought objects 510. A topic vector is used to identify topics associated with a thought calculated based on techniques described herein (referring to FIG. 12). Topic vectors may be used to calculate a diversity score whereby diversity is defined as a Euclidean distance between thought objects previously rated by a particular participant device 621 and thought objects not yet rated by the particular participant device 621 (that is, one or more thought objects 510 available to be selected for distribution to the particular participant device 621).

Response database 610 may store received response information from the plurality of devices 620. In some embodiments, response database 610 holds just priority value responses while in others, priority value responses are held in priority value objects 559. Object database 611 may provide database storage for objects 500 and 600 both pre-configured and objects with assigned data fields. Configuration database 612 provides storage for systems configuration components, for example, at least, configuration for devices 620, system components 600, and the like. It can be appreciated by one with ordinary skill in the art that the above referenced databases provide an exemplary set of databases required to implement system 600 components and data necessary to execute the disclosed methods.

Devices 620 comprise participant devices 621 and leader devices 622. A leader device 622 may configure a project object 539 associated to one or more question objects 546 to solicit a plurality of thought objects 510 based on an arrangement of information in the form of an open-ended free-flow question for the purpose of receiving priority value responses received, by project controller 602, from at least a portion of plurality of participant devices 620 (whereby the at least portion of devices may be hereinafter referred to as participant devices 620) and stored in a plurality of priority value objects 559 for analysis by system 600. In a preferred embodiment, leader devices 622 may initiate and manage a project (as defined in a project object 539 that comprises one or more question objects 546 via a process defined in process object 569) and at least a portion of participant devices 621 (i.e. those that have responded, comprise participant objects 620. In some embodiments, leader devices 622 may be considered participant devices and may act as both a leader device 622 and a participant device 621.

Detailed Description of Exemplary Embodiments

Figure 7:
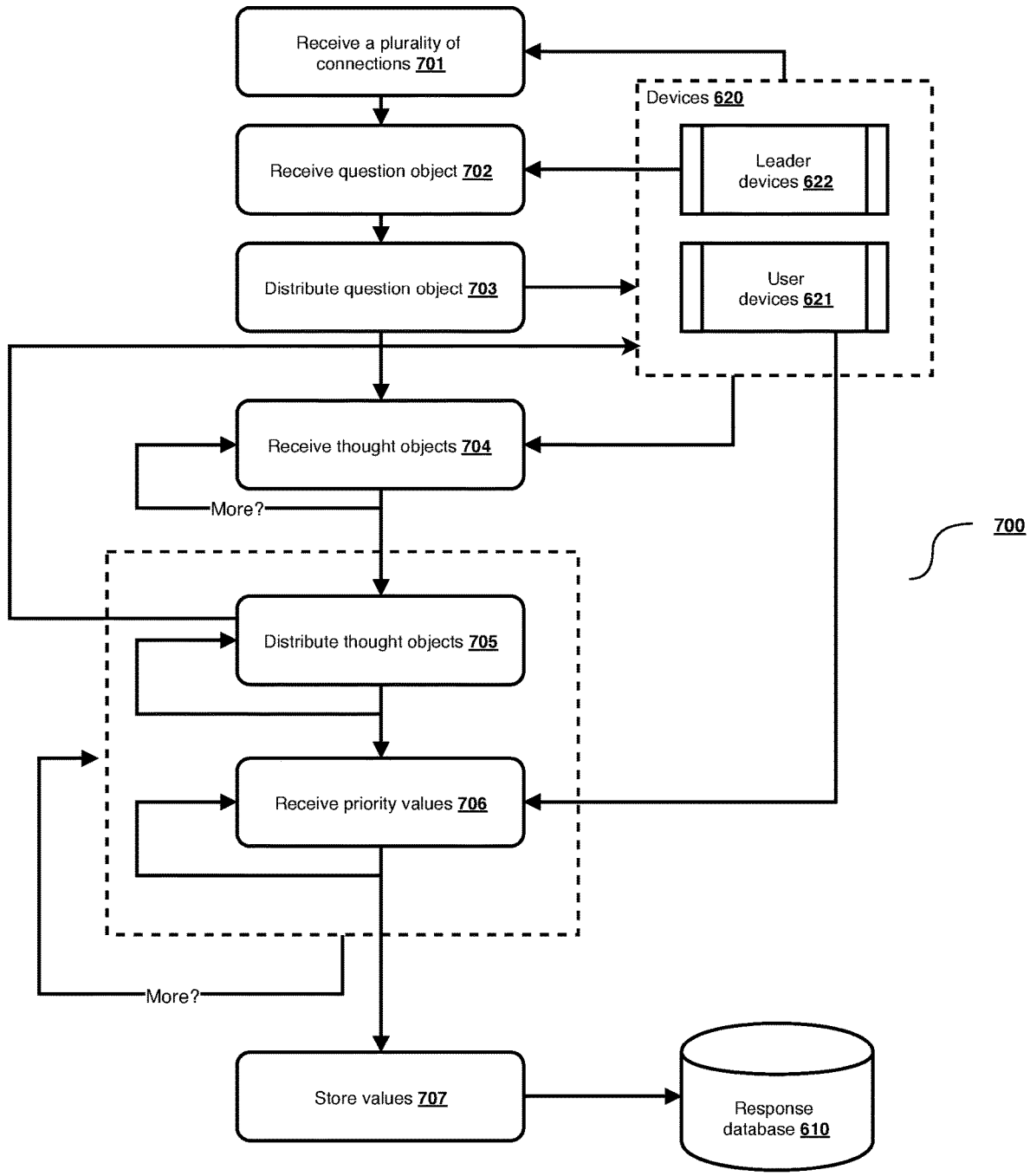
FIG. 7 is a flow diagram illustrating a method for conducting a process to solicit thought objects and priority value responses from a plurality of devices, according to a preferred embodiment of the invention.

FIG. 7 is a flow diagram illustrating a method for conducting a process to solicit thought objects and priority value responses from a plurality of devices, according to a preferred embodiment of the invention. According to the embodiment, in a first step 701, a plurality of connections from a plurality of devices 620 are received via network 310 at device interface 708 to enable communication between system 600 and connected devices 620 and, in some embodiment, remote response database 630. In a next step 702, question object 546 is received, by project controller 602, from a first leader device 622 via device interface 601 to begin a process to solicit thought objects and priority value responses. It should be appreciated that question object 546 may be associated to a previously configured project object 539 and belong to a tenant object 590. Question object 546 may comprise an arrangement of information comprising open-ended free-form text arranged in a manner whereby responses from at least a portion of participant devices 621 may be solicited (for example, arranged in the form of a question), the expected responses comprising a plurality of thought objects 510. In a next step 703, project controller 602 may then distribute question object 546 to at least a portion of devices 620 via device interface 610 on network 310. In a next step 704, a plurality of thought objects 510 may be received by at least a portion of devices 620, the plurality of thought objects 510 each comprising, at least, an arrangement information (for example, within thought_detail 514), the arrangement of information comprising open-ended free-form text arranged in a manner whereby responses from at least a portion of participant devices 621 may be solicited, the expected responses comprising a plurality of priority value objects 559, each priority value object 559 comprising priority value 565 comprising a priority value associated to a thought object (for example thought object 562 may associate priority value 565 to a corresponding thought object 510). Further in step 704, topic generator 613 generates a plurality of topic vectors in a topic table, each topic vector associated to a thought object 510 of the plurality of thought objects 510 (referring to FIG. 12) In a next step 705, the plurality of thought objects 510 may be distributed, by project controller 602, to at least a portion of user devices 620 via device interface 610 over network 310, utilizing thought selection algorithms described herein (referring to FIG. 8) to one or more devices 620. In a next step 706, project controller 602 may receive a plurality of priority value objects 559 (herein referred to as priority value responses) from at least a portion of devices 620, the plurality of priority value responses each associated to a corresponding thought object 510 (as described previously), the at least portion of responding devices 620 herein referred to as participant devices 620, each priority value response associated to a corresponding thought object 510 and a corresponding participant device of the participant devices 620. In a next step 707, project controller 602 may store the plurality of thought objects 510 and associated priority value responses in response database 610 (in some embodiments, project controller 602 may store the plurality of thought objects 510 and associated priority value responses in remote response database 630 via network 310).

Figure 8:
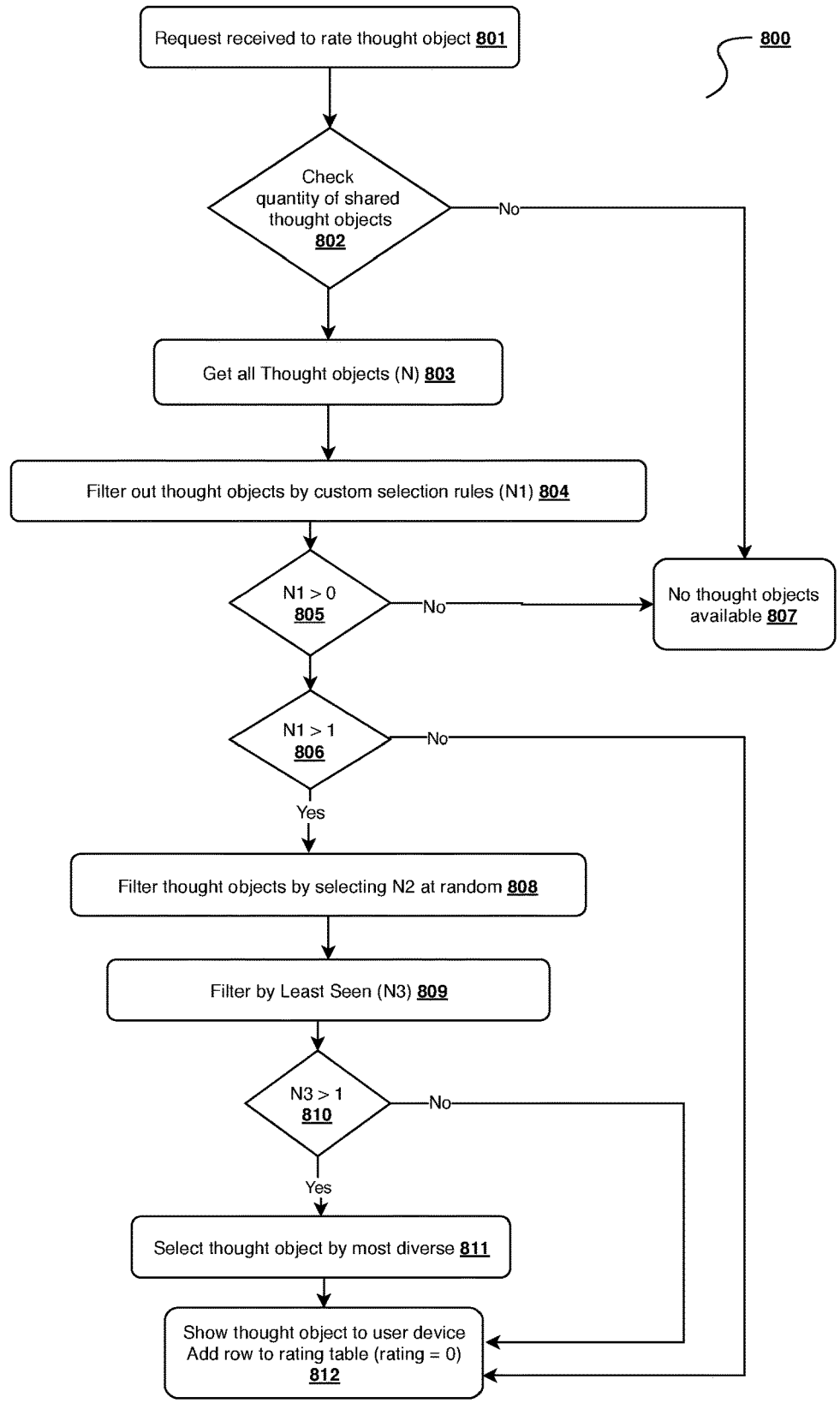
FIG. 8 is a flow diagram illustrating a method for thought object selection based on a plurality of filtering and selection methods, according to a preferred embodiment of the invention.

FIG. 8 is a flow diagram illustrating a method for thought object selection based on a plurality of filtering and selection methods, according to a preferred embodiment of the invention. According to the embodiment, method 800 starts in a first step 801, where a request is received, from a first participant device 621, to rate a thought object 510. In a next step 802, project controller 602 checks a quantity of shared thought objects 510. In a next step 803, all thought objects 510 are retrieved. In a next step 804, at least a portion of thought objects 510 are filtered, by custom selection method (referring to FIG. 9). Once filtered, zero or more filtered thought objects 510 (herein referred to as filtered thought objects 510 N1) are returned. If no filtered thought objects 510 are returned (that is, N1=0), in step 805, then no thought objects 510 are available for selection. Otherwise, in a next step 806, if more than one thought object 510 are returned (that is N1>1), then the returned filtered thought objects 510 (from step 804), are further filtered, in a next step 808, by random selection (herein referred to as N2 which are at least a portion of filtered thought objects 510. In a preferred embodiment five filtered thought objects 510 may be selected at random from N1. In other embodiments, any pre-configured number of filtered thought objects 510 may be selected at random from N1. In a next step 809, filtered thought objects 510 N2 are further filtered by least seen (referring to FIG. 10), that is, a selection of one or more thought objects 510 by those that were delivered to participant devices 621 the least amount of times as compared to other thought objects 510, the returned filtered thought objects 510 herein referred to N3 representing at least a portion of thought objects 510 from N1 or N2. In a next step 810, if N3 filtered thought objects 510 is greater than one, then a thought object 510 is selected by topic (i.e. most diverse) in step 811 (referring to FIG. 11). In a next step 812, final filtered thought 510 is shown to a first user device 620.

Figure 9:
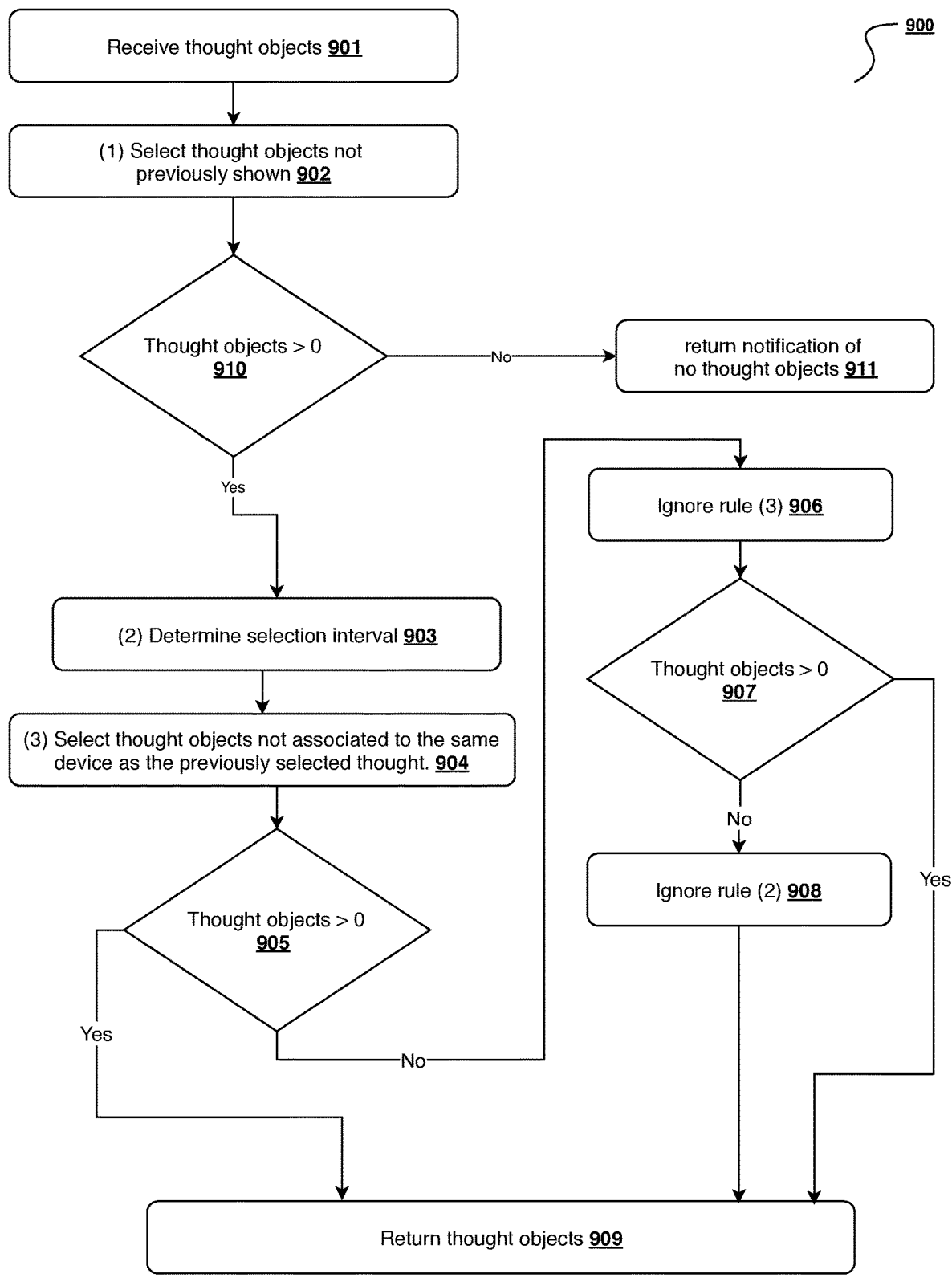
FIG. 9 is a flow diagram illustrating a method for filtering a plurality of thought object based on a plurality of custom selection rules, according to a preferred embodiment of the invention.

FIG. 9 is a flow diagram illustrating a method for filtering a plurality of thought object based on a plurality of custom selection rules, according to a preferred embodiment of the invention. According to the embodiment, a plurality of programming instructions stored in memory 240 when executed by one or more processors 210 cause the one or more processors 210 to perform method 900 for custom selection of one or more filtered thought objects 510 begins in a first step 901 whereby thought objects are received by object selector 607 (for example from object database 611). In a next step 902, the plurality of thought objects 510 may be selected, in a first filtering step (1), by object selector 607, whereby the selected filtered thought objects 510 are at least a portion of thought objects 510 not previously shown (that is delivered) to an output device 260 associated to a first participant device 621. In a next step 910, if no thought objects 510 remain, then a notification that no thought objects 510 are available is returned to the participant device 621, in step 911. Otherwise if there are thought objects 510 remaining from filtering step (1), the process continues. In a next step 903, if the first participant device 621 selects a thought object 510 at a predefined interval (In a preferred embodiment, the predefined interval may be, the $5^{th}$, $10^{th}$, $15^{th}$, etc. thought object 510, i.e. an interval divisible by 5; however, any interval or pattern may be used), then object selector 607 considers only thought objects 510, in a second filtering step (2), shared by the first participant device 621, that is, thought objects 510 associated to the first participant device 621. In a next step 904, thought selector may consider only thought objects 510, in a third filtering step (3), that are not associated to another participant device 621, to which another thought object 510, selected by the thought selector in response to a previous request from first participant device 621, is associated, that is, thought objects 510 not shared by the same user as a thought object 510 previously selected by object selector 607 for the first participant device 621. In a next step 905, if there are one or more filtered thought objects 510, then the filtered thought objects 510 are returned by object selector 607 in step 909; otherwise, if no filtered thought objects 510 result, then the third filtering step is ignored and only filtered thought objects 510, filtered by a first filtering step (1) and a second filtering step (2) are considered in step 907. Further in step 907, if no thought objects 510 result from a first filtering step (1) and second filtering step (2), then the second filtering step (2) is ignored, by object selector 607, and filtered thought objects 510 from a first filtering step (1) only are returned, in step 909, by object selector 607.

Figure 10:
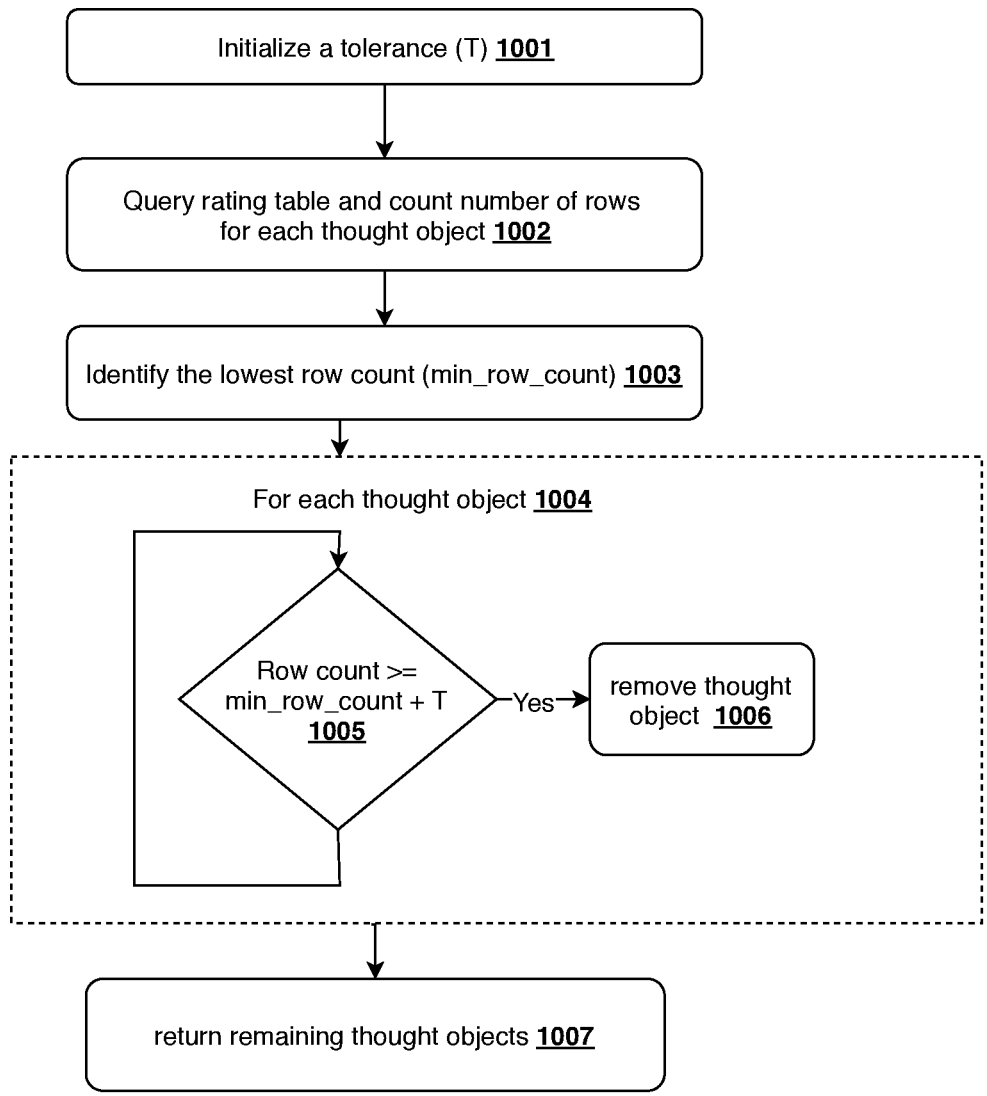
FIG. 10 is a flow diagram illustrating a method for filtering a plurality of thought objects by computing one or more thought objects that were least displayed to an output device of a user device, according to a preferred embodiment of the invention.

FIG. 10 is a flow diagram illustrating a method for filtering a plurality of thought objects by computing one or more thought objects that were least displayed to an output module of a participant device, according to a preferred embodiment of the invention. According to the embodiment, a plurality of programming instructions stored in memory 240 and when executed by at least one processor 210 cause the at least one processor 210 to perform a method for filtering and selecting one or more thought objects 510 that were least displayed on an output device 260 of an associated participant device 621 starting with a first step 1001, object selector 607 initializes a tolerance (T), for example to a zero value. In a next step 1002, a rating table, from object database 611, may be queried to determine a count for a number of rows associated to each thought object 510, representing the number of times the thought object 510 has been displayed on an output device 260 of an associated participant device 621. In a next step 1003, Identify, by object selector 607, the lowest row count (min_row_count) for all thought objects 510. In a next plurality of steps 1004, object selector 607 identifies one or more thought objects 510 by selecting thought objects associated to ratings tables with a row count that may be less than or equal to the lowest row count (referring to step 1003) plus a tolerance by: iteratively analyzing each rating table associated to each thought object 510, in step 1005, whereby if a row count is greater than the min_row_count plus the tolerance, the thought object 510 is removed from consideration in step 1006. Once all thought objects have been analyzed, the remaining thought objects 510 are returned in step 1007.

Figure 11:
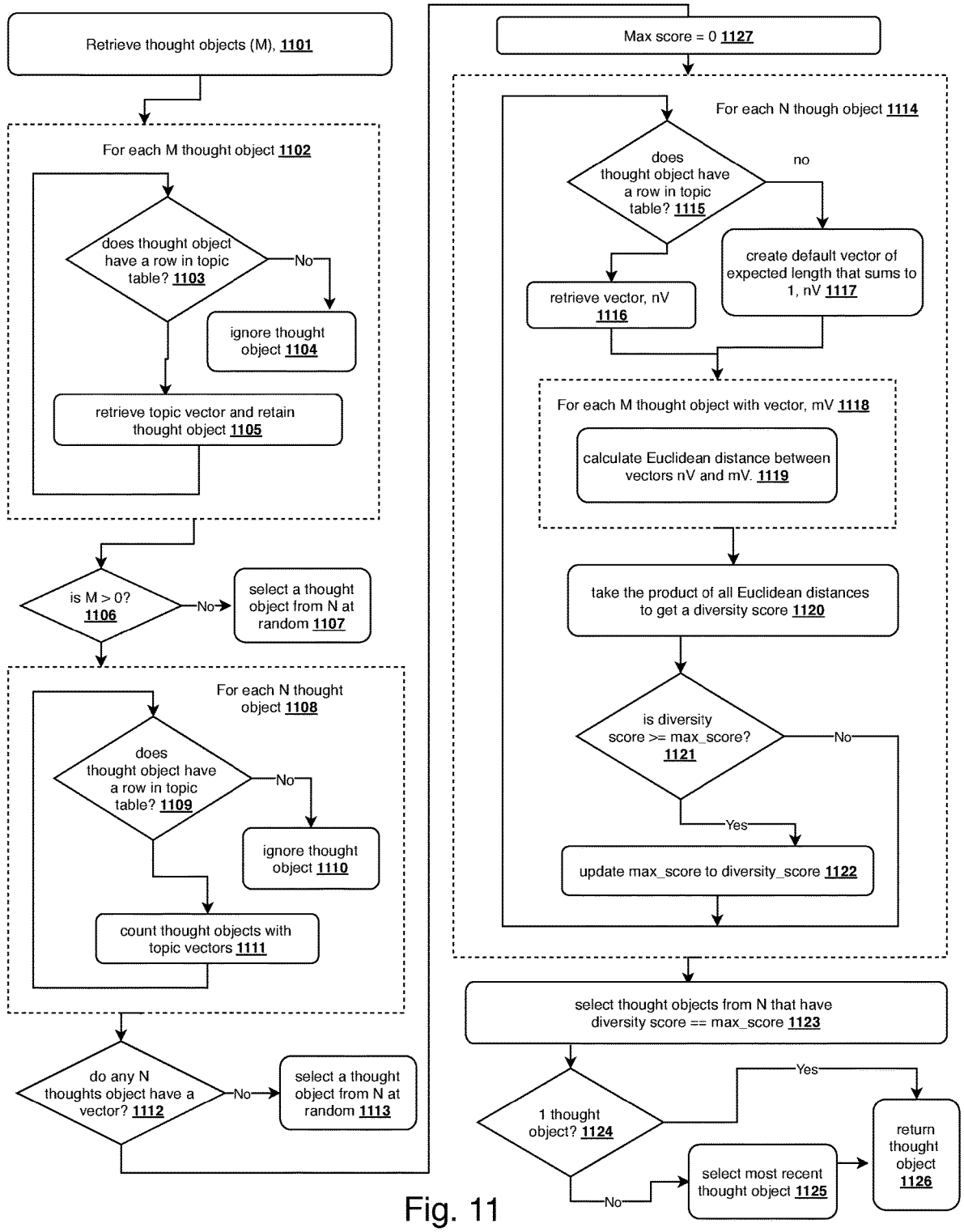
FIG. 11 is a flow diagram illustrating a method for filtering a plurality of thoughts based on a topic calculation, according to a preferred embodiment of the invention.

FIG. 11 is a flow diagram illustrating a method for filtering a plurality of thoughts based on a topic calculation, according to a preferred embodiment of the invention. According to the embodiment, a plurality of programming instructions stored in memory 240 and when executed by at least one processor 210 cause the at least one processor 210 to perform a method for filtering a plurality of thoughts based on a topic calculation beginning in a first step 1101, object selector 607 retrieves the most recent M thought objects 510 previously distributed to the associated participant device 621, where M is 1 in a preferred embodiment (however, in some embodiments, any number may be used for M). That is, M thought objects 510 representing thoughts previously displayed to the associated participant device 621.

In a plurality of steps 1102, for each M thought object 510, object selector 607 may perform the following steps: In step 1103, each M thought object 510 may be checked to see if it has a row in a topic table (as previously calculated referring to FIG. 12) wherein the topic table comprising a plurality of vectors that numerically represent topics associated to thought objects 510. If the M thought object 510 does not have a row in the topic table, in a next step 1104, the thought object 510 is ignored, that is the thought object 510 is not considered in a resulting the filtered set; otherwise, if there is an associated row in a topic table, the topic vector (i.e. the row) associated to the thought is retained, in step 1105, and the process continues at step 1103 until all M thought objects 510 are analyzed.

Once all topic vectors are analyzed for all M thought objects 510 the number of remaining thoughts, from the plurality of steps 1102, is analyzed in step 1106. If there are no remaining M thought objects 510 then a thought object 510 is selected at random from N3 (referring to FIG. 8) 1107 to be distributed to the associated participant device 621; otherwise, a plurality of steps 1108 will be processed on the remaining N3 thought objects 510 in order to select the most diverse thought, relative to the previous M thoughts, to select for distribution to the associated participant device 621.

In a plurality of steps 1108, For each N3 thought object, object selector 607 may perform the following steps: in step 1109, a check to determine if the thought object 510 has a row in the topic table is performed. If it does not, in a next step 1110, the thought object 510 is ignored; otherwise, if there is an associated row in a topic table, a count of thought objects 510 with topic vectors is calculated in step 1111.

Once all topic vectors are analyzed for all N3 thought objects 510, the count of thought objects with topic vectors, from the plurality of steps 1108, is analyzed in step 1112. If the count is zero then a thought object 510 is selected at random from N3 in step 1113; otherwise, steps 1114 is initialized. In step 1114, a max score is initialized (for example to zero) and a plurality of steps 1114 may be processed on the remaining N3 thought objects 510 beginning with step 1115, whereby object selector 607 determines if a first remaining thought object 510 has an associated row in a topic table. If so, the vector (i.e. row nV) is retrieved in step 1116; otherwise object selector 607 creates, in step 1117, a default vector (nV) of an expected length (that is the length of current vectors for other vectors; it should be noted that an expected length would have been known from step 1112 since a check was performed for any N thought objects 510 having a topic vector), the values of the created vector summing to 1. In a next step 1118, for each remaining M thought with a vector in the topic table (mV), a Euclidean distance between mV and nV is calculated, in step 1119, by topic calculator 608. In a next step 1120, a product of all Euclidean distances is calculated, by topic calculator 608, to get a diversity score. In a next step 1121, the diversity score is compared to the max_score, by topic calculator 608. If diversity score is less than the max_score, the method returns to step 1115 to process a next N thought objects 510; otherwise the max_score is updated to equal the calculated diversity score, in step 1122, and the method returns to step 1115 to process a next N thought objects 510.

Once all N3 thought objects 510 are processed, in a next step 1123, all thought objects from N thought objects 510 that each have diversity score equal to max_score is selected by object selector 607. If only one thought object remains in step 1124, the one thought object 510 is returned as the filtered thought 510; otherwise, in step 1125, a most recently shared thought object 510 is selected and returned as the filtered thought object in step 1126.

Figure 12:
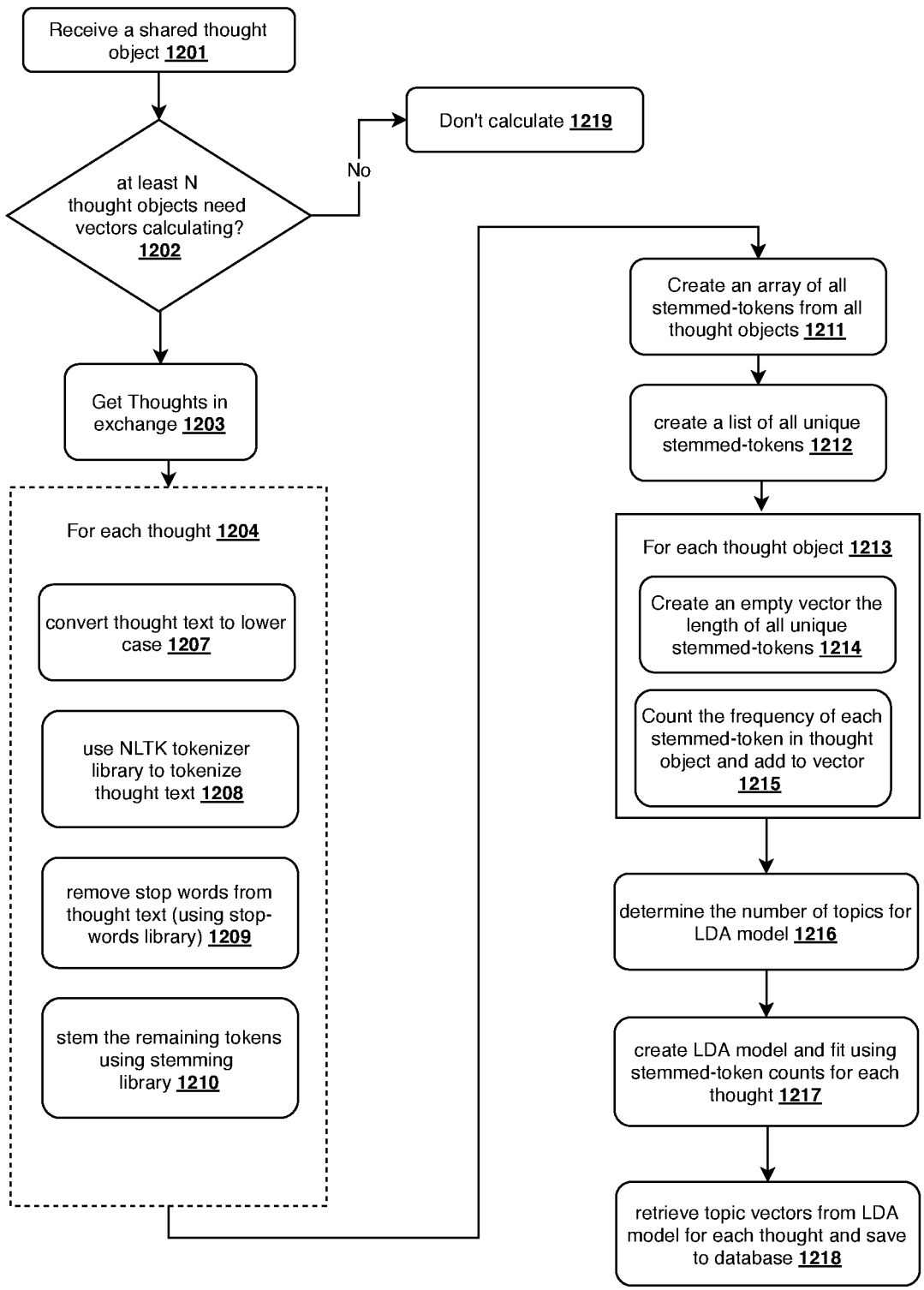
FIG. 12 is a flow diagram illustrating a method for calculating a topic vector, according to a preferred embodiment of the invention.

FIG. 12 is a flow diagram illustrating a method for calculating a topic vector, according to a preferred embodiment of the invention. According to the embodiment, a plurality of programming instructions stored in memory 240 and executed by one or more processors 210 cause the processor to perform a method for calculating a topic vector whereby a vocabulary may be created in a plurality of thought objects parsed by thought-text parser 609 (for example, based on thought_summary 513 and thought_detail 514 associated to a thought object 510) of all thought objects 510 available in an exchange by machine learning and natural language processes disclosed herein to create a statistical model to discover "topics" that occur in one or more thought objects 510 by using text-mining techniques known in the art to discover structures in a text body.

Accordingly, in a first step 1201, a shared thought object 510 is received, by the project controller 602, from a first participant device 621 of a plurality of participant devices 621. In a next step 1202, at least a quantity N of thought objects that need topic vectors calculated is determined, by topic calculator 608, whereby N may be a pre-configured or a dynamically calculated number. If no thought objects need a calculation of a topic vector, in a next step 1219, no calculation is performed. If at least a quantity N of thought objects need topic vectors, in step 1203, all thought objects in an exchange are retrieved. In a next plurality of steps 1204, for each thought object 510 the following steps are performed by topic calculator 608: In step 1207, thought object 510 is converted to lower case. In a next step 1208, a tokenizer library (for example, Natural Language Toolkit (NLTK)) may be used to tokenize thought object 510, that is, assign a token to each word. In a next step 1209, thought-text parser 609 may remove stop words from thought object 510 whereby the stop words may be pre-configured in a list. Accordingly, the tokens associated to the stop list words are removed, by thought-text parser 609, from thought object 510. In a next step 1210, thought-text parser 609 may stem the remaining tokens (for example, using NLTK stemming library), by shortening words to their root value by a process of reducing inflected (or sometimes derived) words to their word stem, base or root form using a stemming program, stemming algorithm, or other stemmer techniques known in the art.

In a next step 1211, an array of all stemmed-tokens from all thought objects 510 may be created by thought-text parser 609. In a next step 1212, a list of all unique stemmed-tokens may be created by thought-text parser 609. In a next plurality of steps 1213, for each thought object 510 the following steps are performed by topic calculator 608: in step 1214, an empty vector the length of all unique stemmed-tokens may be created; in a next step 1215, a frequency of each stemmed-token in thought object 510 is computed and added to the vector.

In a next step 1216, the number of topics for a latent Dirichlet allocation (LDA) model may be determined by document generator 609. In an exemplary embodiment, a number of topics N may be found using any integer value based on the number of thought objects 510. For example, N may be: 10, if fewer than 21 thought objects 510; 20, if fewer than 31 thought objects 510; 30, if fewer than 41 thought objects 510; 40, if fewer than 51 thought objects 510; 50, if more than 50 thought objects 510. In a next step 1217, an LDA model is generated using stemmed-token counts for each thought object 510. In a next step 1218, a plurality of topic vectors is retrieved, by thought-text parser 609, from the LDA model for each thought object 510 and saved to object database 611 as a thought object topic table.

The skilled person will be aware of a range of possible modifications of the various embodiments described above. Accordingly, the present invention is defined by the claims and their equivalents.

What is claimed is:

1. A system for selecting a thought object, from a plurality of thought objects, to send to a user device comprising:
   a thought object selection computer comprising a memory, a processor, and a plurality of programming instructions, the plurality of programming instructions when executed by the processor cause the processor to:
   receive a plurality of connections from a plurality of user devices over a network;
   receive a question object comprising, at least, an arrangement of information from a leader user device of the plurality of user devices;
   send the question object to at least a portion of the plurality of user devices;
   receive a plurality of thought objects from at least a portion of user devices;
   determine a filtered set of thought objects, of the plurality of thought objects, to distribute to the at least portion of the plurality of user devices, the filtered set of thought objects determined by custom selection;
   upon a quantity of the filtered set of thought objects determined by custom selection being greater than a quantity of zero then:

if the filtered set of thought objects is a quantity of one then send the filtered set of thought objects to a first user device;

otherwise:

if the quantity of the filtered set of thought objects is greater than a pre-configured amount then optionally update the filtered set of thought objects by randomly selecting a pre-configured subset of the filtered set of thought objects;

further filter the filtered set of thought objects by determining one or more least seen thought objects;

if only one thought object remains of the filtered set of thought objects, then send the filtered set of thought objects to the first user device;

otherwise:

select a most diverse thought object of the filtered set of thought objects and send the most diverse thought object to the first user device.

2. The system of claim 1, wherein custom selection comprises a further plurality of programming instructions, the further plurality of programming instructions when executed by the processor cause the processor to:

(a) compute if there is at least one thought object, of the plurality of thought objects, that has not already been shown to the first user device, if so, select the at least one thought objects;

(b) compute if the first user device is requesting an nth thought object, the nth number being a multiple of a preconfigured nth number, then select at least one thought object shared by the first user device;

(c) compute if there is at least one thought object that was not shared by a user device associated to a previously selected thought object assigned to the first user device, select the at least one thought object;

(d) if no thought objects have been selected after performing steps (a), (b), and (c), select the at least one thought objects remaining from step (b);

(e) if no thought objects have been selected after performing steps (a) and (b), select the at least one thought objects remaining from step (a).

3. The system of claim 1, wherein determining one or more least seen thought objects comprises a further plurality of programming instructions, the further plurality of programming instructions when executed by the processor cause the processor to:

set a pre-configured tolerance;

determine a plurality of row counts, each row associated to ratings associated to a thought object of the plurality of thought objects;

identify a lowest row count of the plurality of row counts;

for each thought object of the plurality of thought objects:

if an associated row count is greater than a sum of the lowest row count plus the tolerance, then removing the thought object from the filtered set of thought objects.

4. The system of claim 1, wherein a selection of the most diverse thought object comprises a further plurality of programming instructions, the further plurality of programming instructions when executed by the processor cause the processor to:

compute a topic vector for each thought object, of the plurality of thought objects, comprising the steps of:

process text associated to the thought object to make it suitable for topic modeling; generate a token for each thought object and count the frequency of each token across the plurality of thought objects;

generate, using a latent Dirichlet allocation, a plurality of topic vectors, each topic vector associated to a thought object of the plurality of thought objects.

5. The system of claim 4, wherein to make the text suitable for topic modeling comprises a further plurality of programming instructions, the further plurality of programming instructions when executed by the processor cause the processor to:

convert thought object text to lower case;

split the text into tokens;

remove tokens that exist in a pre-configured referenced list of stop words; and, stem the remaining tokens.

6. The system of claim 1, wherein a selection of the most diverse thought object further comprising a further plurality of programming instructions, the further plurality of programming instructions when executed by the processor cause the processor to:

receive a plurality of previous topic vectors, each previous topic vector of the plurality of previous topic vectors associated to a thought object previously assigned to the first user device;

receive a plurality of target topic vectors, each target topic vector associated to a thought object of the filtered set of thought objects;

calculate, for each target topic vector of the plurality of topic vectors, a Euclidean distance between that target topic vector and at least a portion of previous topic vectors;

compute for each filtered thought object, a diversity score by multiplying the Euclidean distances of an associated topic vector to each previous topic vector of the plurality of previous topic vectors;

select one or more diverse thought objects of the filtered thought objects with a highest diversity score;

if a quantity of the one or more diverse thought objects is one, then send the one or more diverse thought object to the first user device;

otherwise select the most recently shared thought object and send the most recently shared thought object to the first user device.

7. The system of claim 1, wherein the pre-configured amount is a quantity of five.

8. The system of claim 1, wherein the pre-configured subset is a quantity of five.

9. A computer-implemented method for selecting a thought object, from a plurality of thought objects, to send to a user device comprising the steps of:

receiving, at a device interface, a plurality of connections from a plurality of user devices over a network;

receiving, at a project controller, a question object comprising, at least, an arrangement of information from a leader user device of the plurality of user devices;

sending, by the project controller, the question object to at least a portion of the plurality of user devices;

receiving, at the project controller, a plurality of thought objects from at least a portion of user devices;

determining a filtered set of thought objects of the plurality of thought objects to distribute to the at least portion of user devices, the filtered set of thought objects determined by custom selection;

upon a quantity of the filtered set of thought objects determined by custom selection being greater than zero then:

if the filtered set of thought objects is a quantity of one then select the thought object and send the filtered set of thought objects to a first user device;

otherwise:
  if the quantity of the filtered set of thought objects is greater than a pre-configured amount then optionally update the filtered set of thought objects by randomly selecting a pre-configured subset of the filtered set of thought objects;
  further filter the filtered set of thought objects by determining one or more least seen thought objects;
  if only one thought object remains of the filtered set of thought objects, then send the filtered set of thought objects to the user device;
  otherwise:
    select a most diverse thought object of the filtered set of thought objects and send the most diverse thought object to the first user device.

10. The method of claim 9, wherein custom selection comprises the steps of:
  (a) if there is at least one thought object, of the plurality of thought objects, that has not already been shown to the first user device, selecting the at least one thought objects;
  (b) if the first user device is requesting an nth thought object, the nth number being a multiple of a preconfigured number, then selecting at least one thought object shared by the first user device;
  (c) if there is at least one thought object that was not shared by a user device associated to a previously selected thought object assigned to the first user device, selecting the at least one thought object;
  (d) if no thought objects have been selected after performing steps (a), (b), and (c), then, select the at least one thought objects remaining from step (b);
  (e) if no thought objects have been selected after performing steps (a) and (b) then, select the at least one thought objects remaining from step (a).

11. The method of claim 9, wherein determining one or more least seen thought objects comprises the steps of:
  setting a pre-configured tolerance;
  determining, at a ratings table in a database, a plurality of row counts, each row associated to ratings associated to each thought object of the plurality of thought objects;
  identify a lowest row count of the plurality of row counts;
  for each thought object of the plurality of thought objects:
    if an associated row count is greater than a sum of the lowest row count plus the tolerance, then removing the thought object from the filtered set of thought objects.

12. The method of claim 9, wherein the most diverse thought object is selected by computing a topic vector for each thought object, of the plurality of thought objects, comprising the steps of:
  processing text associated to the thought object to make it suitable for topic modeling;
  generating a token for each though object;
  counting the frequency of each token across the plurality of thought objects;
  generating, using a latent Dirichlet allocation, a plurality of topic vectors, each topic vector associated to a thought object of the plurality of thought objects.

13. The method of claim 12, wherein making the text suitable for topic modeling comprises the steps of:
  converting thought object text to lower case;
  splitting the text into tokens;
  removing tokens that exist in a pre-configured referenced list of stop words; and,
  stemming the remaining tokens.

14. The method of claim 9, further comprising the steps of:
  receiving, from a project controller, a plurality of previous topic vectors, each previous topic vector of the plurality of previous topic vectors associated to a thought object previously assigned to the first user device;
  receiving a plurality of target topic vectors, each target topic vector associated to a thought object of the filtered set thought objects;
  for each target topic vector, of the plurality of topic vectors, calculating a Euclidean distance between that target topic vector and at least a portion of previous topic vectors;
  for each filtered thought object computing a diversity score by multiplying the Euclidean distances of an associated topic vector to each previous topic vector of the plurality of previous topic vectors;
  select one or more diverse thought objects of the filtered thought objects with a highest diversity score;
  if a quantity of the one or more diverse thought objects is one, then send the one or more diverse thought object to the first user device;
  otherwise select the most recently shared thought object and send the most recently shared thought object to the first user device.

15. The method of claim 9, wherein the pre-configured amount is a quantity of five.

16. The method of claim 9, wherein the pre-configured subset is a quantity of five.

* * * * *